United States Patent

Kovacs et al.

[11] Patent Number: 5,509,370
[45] Date of Patent: Apr. 23, 1996

[54] AMPHIBIOUS LAND RECLAMATION VEHICLE

[75] Inventors: Peter Kovacs; Mihaly Kovacs; Endro Kovacs, all of Plant City, Fla.

[73] Assignee: Kempco, Inc., Ft. Meade, Fla.

[21] Appl. No.: 145,214

[22] Filed: Nov. 3, 1993

Related U.S. Application Data

[63] Continuation-in-part of Ser. No. 906,446, Jun. 30, 1992, abandoned.

[51] Int. Cl.⁶ .................................................. B63H 1/26
[52] U.S. Cl. .................................................. 114/270; 180/7.2
[58] Field of Search .................. 180/7.2; 114/270; 440/48, 98, 99, 73; 280/830, 834, 759, 770

[56] References Cited

U.S. PATENT DOCUMENTS

| | | | |
|---|---|---|---|
| 669,210 | 3/1901 | Burch | 180/7.2 |
| 864,106 | 8/1907 | Peavey | 180/7.2 |
| 1,211,345 | 1/1917 | Petersen | 115/19 |
| 1,303,765 | 5/1919 | Broadway | 440/98 |
| 2,154,191 | 4/1939 | Welsh | 115/19 |
| 2,706,958 | 4/1955 | Cutting et al. | 115/19 |
| 2,930,439 | 4/1960 | Alig et al. | 180/49 |
| 3,224,407 | 12/1965 | Bertrand | 115/1 |
| 3,381,650 | 5/1968 | Itoh et al. | 115/1 |
| 3,395,671 | 8/1968 | Zimmerman, Jr. | 115/1 |
| 3,397,668 | 8/1968 | Mainguy | 115/1 |
| 3,403,745 | 10/1968 | Commons | 180/26 |
| 3,746,112 | 7/1973 | Hon | 180/6.2 |
| 4,476,948 | 10/1984 | Nakamura | 180/7.2 |
| 4,734,067 | 3/1988 | Elias-Reyes | 440/48 |

FOREIGN PATENT DOCUMENTS 381669  1/1908  France .

Primary Examiner—Edwin L. Swinehart
Attorney, Agent, or Firm—Dowell & Dowell

[57] ABSTRACT

A lightweight vehicle which is operational on water, mud, marshy areas and other ground surfaces which includes a raised main frame upon which controls are provided for independently rotating at least one pair of drive drums which are mounted on opposite sides of the main frame. The drive drums are of a hollow cylindrical configuration and of a size to provide sufficient buoyancy to allow the vehicle to float on water. Each drive drum is provided with a spiral flute for developing propulsion and is driven by one or more hydraulic motors mounted axially with respect to the drum. Cutter bars are mounted to the frame and extend toward the ends of the drums to prevent debris interference with the drive shafts or bearings on which the drums are mounted.

15 Claims, 4 Drawing Sheets

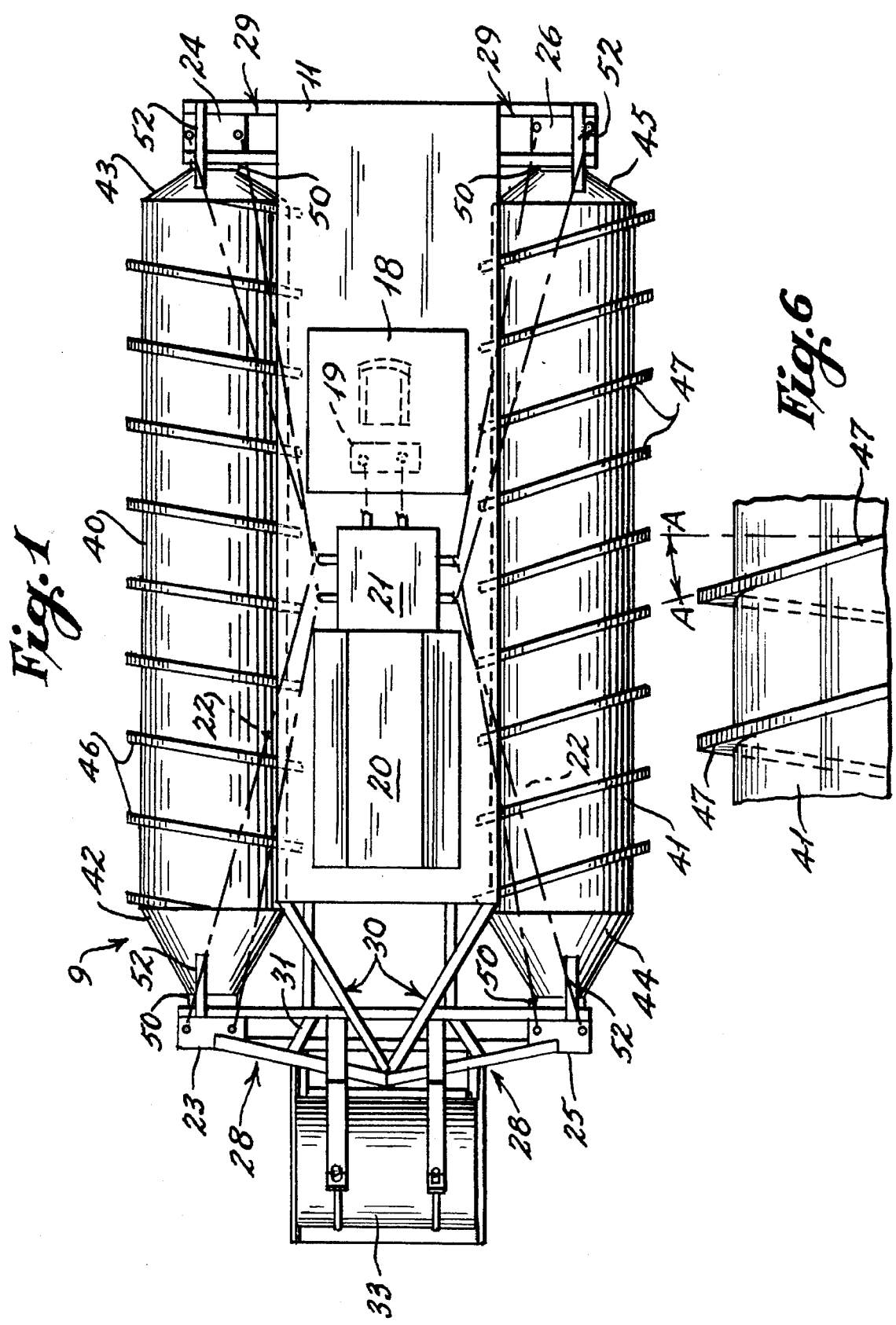

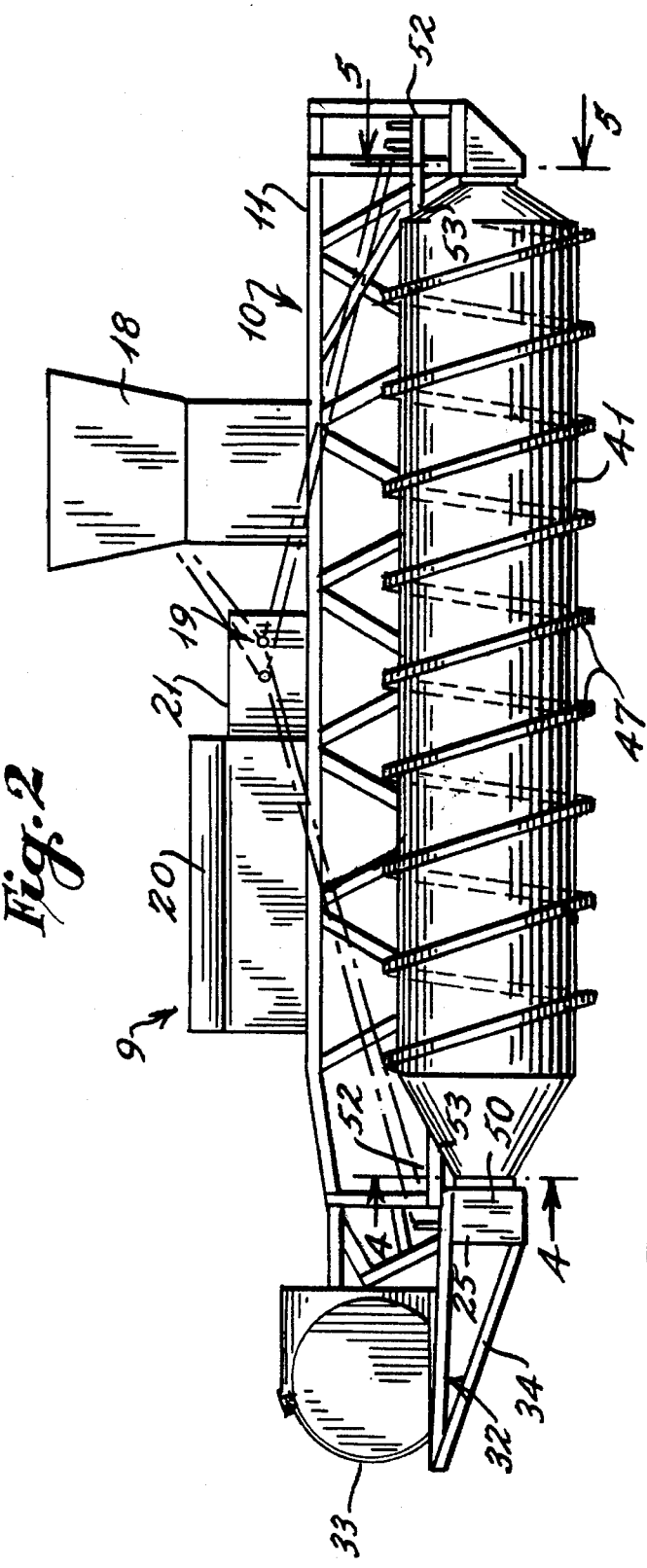
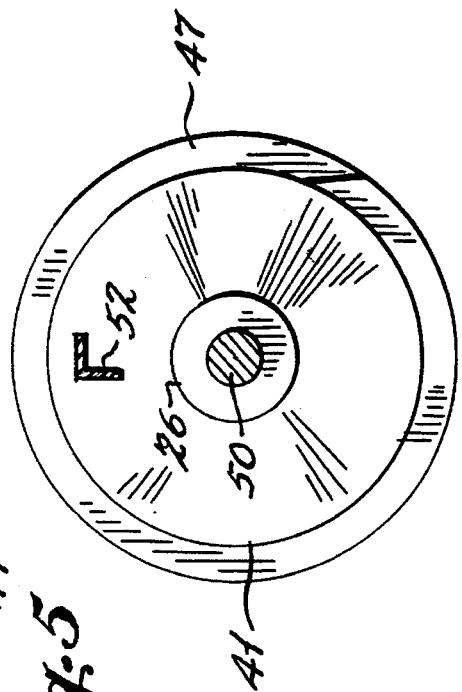
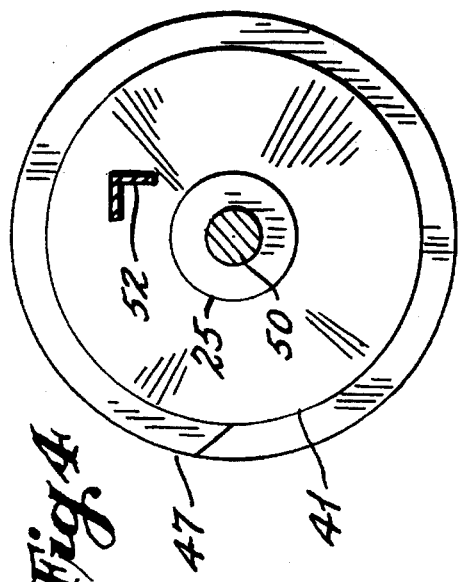

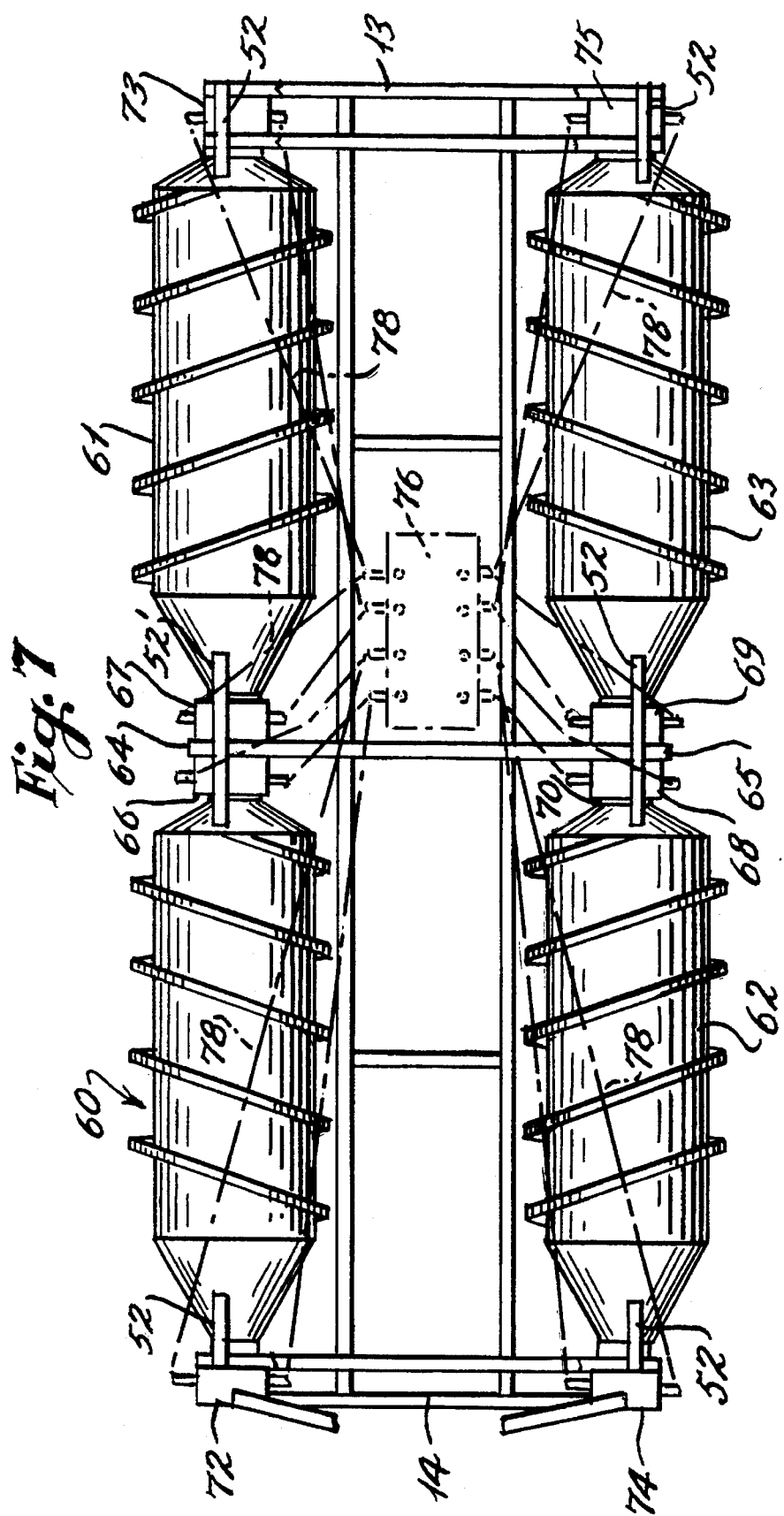

AMPHIBIOUS LAND RECLAMATION VEHICLE

CROSS REFERENCE TO RELATED APPLICATIONS

This application is a continuation-in-part of application Ser. No. 07/906,446, filed Jun. 30, 1992, now abandoned entitled AMPHIBIOUS LAND RECLAMATION VEHICLE, in the name of the present inventors.

FIELD OF THE INVENTION

This invention is generally directed to land reclamation vehicles and more particularly to a lightweight amphibious vehicle which is designed to be utilized in areas which have been surface mined and wherein the land generally is left in a condition wherein the surface characteristics may change from one section to another from pools of water to marshy, muddy and slimy consistencies and to areas wherein substantial vegetation and tree growth may be present.

The invention is further directed to a land reclamation vehicle in which the drive means for the vehicle is also the means by which the vehicle is made buoyant and wherein the vehicle includes at least one drive drum on either side thereof, each of which is independently rotatable by separate drive motors and each of which includes a spiral flute along the length thereof for propulsion. The vehicle frame is elevated with respect to the drums to prevent vehicle drag.

HISTORY OF THE RELATED ART

Although there have been various types of amphibious vehicles designed for use on both land and water, most such vehicles are not suitably designed to permit their operation in conditions where the ground surface consistencies may be insufficient to provide any load bearing capacity such as in muddy, swampy areas frequently encountered in reclaiming lands which had been surface mined for minerals and chemicals such as the phosphorus mines and pits which are prevalent in the state of Florida in the United States.

In order to reclaim surface mined areas, it is necessary to utilize vehicles which can operate in swamp-like conditions to establish drainage ditches to distribute surface waters to drier areas to permit the drying of the surface to promote the reclamation of the land site. In many such areas, the water table is at ground surface or just below, creating situations wherein many conventional type amphibious vehicles would not be capable of operating as the frames of such vehicles would become bogged down in the mud and slime. Further, vegetation in such areas may often be dense and interfere with vehicle operation by clogging vehicle drive mechanisms.

Some attempts have been made in the past to utilize conventional earth working equipment in land reclamation projects however, these uses of such equipment have met with severe limitations. Conventional track and larger tire vehicles such as bulldozers, backhoes, dredgers and the like are suitable for use when the ground consistency is sufficient to provide bearing support for such vehicles. However, in those instances where the ground consistency is such that the water table is essentially at ground level, the weight of the vehicles causes the vehicles to be mired into the ground thereby preventing their obtaining traction to maneuver in such soil conditions. Other attempts have been made to utilize specially designed barges which are placed within swampy areas and which are designed to float on surface water. Such barges are provided with dredging equipment such as backhoes, shovels, clamshells and the like which are utilized to dig into the surface to create drainage channels or are used to excavate mud and muck and transfer it from one area to another where drying is permitted. Unfortunately, the use of barge equipment is limited to areas in which barges may operate and float freely. In many land reclamation areas the use of such equipment would not be practical as much as the surface to be reclaimed would not include sufficient free standing water to permit operation of a barge.

Other modifications have been proposed to allow more conventional dredging and earth working equipment to be utilized in land reclamation projects. Some such modifications have included increasing the surface contact area of the track associated with a piece of equipment or increasing the sizes of tires of a vehicle to thereby further distribute the load of the vehicle across the earth surface. Again, such modifications have found only limited acceptance in land reclamation especially in those areas where the surface of the soil is so unstable that little or no load bearing capacity is provided.

Some types of floatable equipment have been designed which include cylindrical drive drums having flutes on the outer surface thereof for creating propulsion when the vehicles are being operated in water. Some examples include machines such as disclosed in U.S. Pat. Nos. 2,154,191 to Welsh, 2,706,958 to Cutting et al., 3,224,407 to Bertrand, 3,381,650 to Itoh et al., 3,395,671 to Zimmerman, Jr., 3,397,668 to Mainguy, 3,746,112 to Ilon and 4,476,948 to Komoto et al.

Some drum driven amphibious equipment is constructed with the hull of the equipment designed to provide floatation while propulsion is accomplished utilizing spiral flutes on the drive drums. See for example U.S. Pat. No. 3,746,112 to Ilon. However, such vehicles could not be utilized in most land reclamation projects as the drive drums themselves do not provide buoyancy and the weight of the main body of the vehicle, including its hull, would drive the drive drums into the earth.

Additional examples of amphibious and/or related drum drive vehicles are disclosed in U.S. Pat. Nos. 669,210 to Burch, 864,106 to Peavey, 1,211,345 to Peterson, 2,503,111 to Higgins, 2,930,439 to Alig et al., 3,403,745 to Commons, and 3,420,326 to Kusmer.

SUMMARY OF THE INVENTION

This invention is directed to a lightweight amphibious land reclamation vehicle which is maneuverable in water, muds and slime, in areas of thick vegetation, and in soil conditions wherein the soil has little to no load bearing capacity and wherein the vehicle includes a main frame which is elevated with respect to the surface being traversed by independently controllable and rotatable drive drums which are mounted on opposite sides of the vehicle. The vehicle includes at least one pair of drive drums on opposite sides thereof, each of which is generally cylindrical in configuration and hollow and of a combined size to provide sufficient buoyancy to allow the vehicle to be floatable. Each drum is provided with a spiral flute which extends outwardly from the surface thereof at an angle of generally less than 20° with respect to a plane taken perpendicularly to the axis of rotation of the drums and which spiral flute provides propulsion for the vehicle over both water and ground surfaces. The flutes are generally limited in projection from the surface of the drums to approximately 3 inches to prevent adverse cutting into ground surfaces with a high water table. When pairs of drive drums are used on each side of the vehicle, the flutes of each drum on the same side of the vehicle are oriented in opposite directions relative to one another.

In the preferred embodiment, hydraulic motors are mounted to outriggers adjacent each end of the drums with pairs of motors being connected to each drive drum. The outriggers are slopped so as to elevate the main frame above the drive drums to prevent vehicle drag. The interface between each motor and the adjacent end of a drum is provided with a cutter bar which prevents vegetation from interfering with vehicle operation. To further increase maneuverability of the vehicle in areas where the ground surface has little to no load bearing capacity, each drive drum is rotatably mounted about a fixed axis and the vehicle only includes essential components which are attached to an open main frame.

It is the primary object of the present invention to provide a lightweight vehicle which can be utilized in land reclamation and which is operable both on water and in areas of poor soil stability and wherein the vehicle is operable without becoming mired or stalled in areas where mud, slime and/or thick vegetation is prevalent.

It is another object of the present invention to provide a lightweight land reclamation vehicle wherein the main frame of the vehicle is elevated with respect to drive drums mounted on opposite sides thereof and wherein the drive drums provide the buoyancy for the vehicle whereby the main frame of the vehicle is at all times elevated with respect to the surface being traversed.

It is also an object of the present invention to provide a lightweight land reclamation vehicle to which various types of dredging equipment may be attached including excavating buckets, dredging scoops, pumps and the like, and wherein the vehicle is driven by floatable drive drums each of which includes a spiral flute for creating propulsion. When pairs of drums are used on each side of the vehicle, the flutes of aligned drums are oriented in opposite directions to thereby increase maneuverability of the vehicle and to reduce interference with surface materials.

It is also an object of the present invention to provide a land reclamation vehicle which is operable under conditions in which conventional land reclamation equipment cannot be used and wherein the interface between the drive motor and drive drums are continuously cleaned by cutting bars mounted in close proximity to each end of the drums.

BRIEF DESCRIPTION OF THE DRAWINGS

FIG. 1 is a top plan view of a first embodiment of amphibious the vehicle of the present invention;

FIG. 2 is a left side elevational view of the amphibious vehicle of FIG. 1;

FIG. 4 is an enlarged cross sectional view taken along lines 4—4 of FIG. 2;

FIG. 5 is an enlarged cross sectional view taken along lines 5—5 of FIG. 2;

FIG. 6 is a partial left side view of a drive drum shown in FIG. 2 and reflecting the pitch angle of the spiral flute associated therewith; and FIG. 7 is a top plan view of a second embodiment of the present invention.

DESCRIPTION OF THE PREFERRED EMBODIMENT

Figure 3:
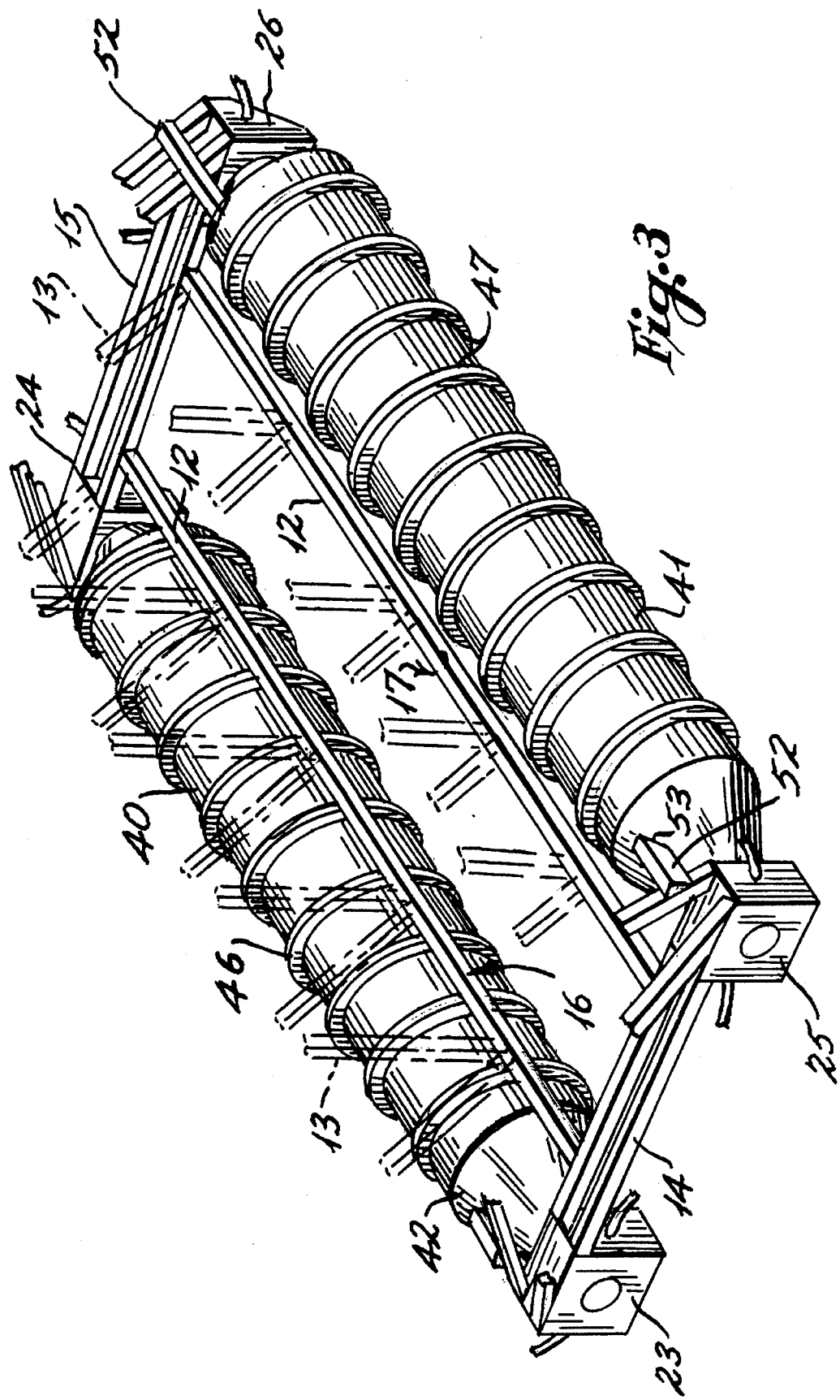
FIG. 3 is a front perspective view of the drive drums of the vehicle shown in FIG. 1.

With continued reference to the drawings, the lightweight amphibious land reclamation vehicle 9 of the present invention includes a main open framework 10 having upper portions 11 and, portion beams 12, which are reinforced and joined by struts 13. The frame includes a front end 14, rear end 15 and opposite sides 16 and 17. An operator station 18 is mounted to the upper portion of the frame adjacent the rear end thereof. It is desired to maintain the framework as open as possible to reduce the overall weight of the vehicle. The operator station includes controls 19 which are utilized to operate an engine 20 and hydraulic valving 21 which hydraulic valving is connected by hydraulic lines 22 between a main hydraulic tank and a plurality of hydraulic drive motors 23, 24, 25 and 26. In this manner, each pair of drive motors on the same side of the frame are simultaneously controllable in both a forward and reverse direction for allowing the vehicle to be maneuvered in a manner which will be discussed in greater detail hereinafter. A pair of front outrigger frames 28 extend outwardly at a declining angle from either side of the main frame adjacent the front end thereof, and a second pair of rear outrigger frames 29 extend outwardly and downwardly from opposite sides of the main frame adjacent the rear end portion thereof. Each front outrigger frame 28 is connected by way of a V-shaped bracing 30 to the upper portion of the main frame and by generally longitudinal bracing 31 to the lower portion of the main frame.

Each of the drive motors 23–26 is attached to the outermost portion of one of corresponding outriggers and is fixed so as to be aligned with an opposing motor at the opposite end of the main frame so that the axis of rotation of motors 23 and 24 is a common axis and the axis of rotation of motors 25 and 26 is a common axis. It should be noted that the outriggers 28 and 29 orient the hydraulic motors below the lower portion of the main frame so that the frame will not drag on material over which the vehicle is passing. A platform assembly 32 is mounted forwardly of the outriggers 28 and supports a fuel tank 33 cantilevered from the front of the vehicle. Sloped bracing 34 is provided to support the platform and to act as an inclined ram or ramp to force vegetation beneath the main frame when the vehicle is traveling in a forward direction. The fuel tank is used as a ballast to distribute the weight of the vehicle equally along its length, especially when dredging equipment or pumps are mounted to the rear of the vehicle.

The land reclamation vehicle is designed to be propelled, and buoyantly supported, by at least one pair of drive drums located on opposite sides of the vehicle. The drive drums on the right side of the vehicle are designated at 40 while the drive drums mounted on the left side of the vehicle are designated 41. Drive drum 40 includes a forward generally conical end 42 which is mounted to drive motor 23 and a conical rear end 43 which is mounted to the motor 24. Drive drum 41 is mounted with its forward conical end 44 connected to drive motor 25 while the rear conical end 45 thereof is mounted to motor 26. The drums 40 and 41 are mounted along a fixed axis and preferably driven by pairs of motors. In some embodiments only a single drive motor may be necessary.

Each of the drive drums is hollow and includes a generally cylindrical outer surface. The diameter of the drive drums is determined by the size and weight of the vehicle, including its main frame. The drums must be suitable to provide sufficient displacement and buoyancy to allow the entire vehicle to be floatable in water. Further, the drums are preferably designed to have a maximum immersion or depth in water of generally not more than 1/3 of their diameter when the vehicle is in use.. With specific reference to FIGS. 2 and 3, the drums are mounted so that at least approximately the lower one-half of the periphery thereof extends below the bottom 12 of the main frame so that the main frame is elevated with respect to the bottom portion of each of the drive drums. The frame is thus elevated with respect to water or other surfaces being traversed by the vehicle.

Propulsion for the vehicle is created by spiral flutes which are mounted around each of the drive drums. Drive drums 40 and 41 include spiral flutes 46 and 47 extending from one end thereof to the other with the flutes being pitched at approximately 20° or less relative to a plane taken perpendicularly with respect to the rotational axis of each drum, as is shown in FIG. 6 as angle A. The flutes are shown as being oriented at 20° or less from the right side of the plane so the fluting is oriented or pitched in a direction towards the front of the vehicle.

It is preferred that the angle of inclination or pitch of each of the flutes be between 18° and 19° but not greater than 20°. A minimum angle of inclination is necessary to reduce disturbance of the surface material through which the vehicle operates. The lesser the angle needed for propulsion, the less the chance of disturbing the surface material. During land reclamation, it is desirable that as little soil or surface material be disturbed as is possible to allow propulsion of the vehicle relative thereto. Along the same line, the flutes of the present invention are designed to extend outwardly with respect to the surface of the drive drums at a distance not greater than approximately 3 inches. By limiting the extension of the propulsion fluting with respect to the surface of the drive drums, the degree to which they penetrate the surface material is limited thereby increasing the effectiveness and maneuverability of the unit through muddy terrain.

With particular reference to FIGS. 2, 4 and 5, when the vehicle of the present invention is utilized in marshy areas in which there is a great deal of vegetation in the form tall swamp grass, cattails and trees ranging in trunk thicknesses up to several inches in diameter, it is possible that such vegetation in conventional vehicles will clog or jam the interface between the drive drums and the drive bearings or drive shafts, such as shown at 50 in the present application, which connect the motors to each end of the drive drums. When this occurs, it is necessary to stop the vehicle and cut such debris and other material from the interface between the motors and drive drums. This often results in a great deal of down time for the vehicle. In order to prevent this, the present invention incorporates cutting bars 52 which extend rearwardly from the front outriggers toward the conical end portions of each of the drive drums. Each cutter bar is preferably formed of a steel angle having the front ends cut as a bevelled surface 53 which follows the general slope of the conical portion of the drum. Likewise, cutting bars 52 are mounted to the rear outriggers and extend forwardly to their front slope surfaces 53 which are closely spaced adjacent to the conical ends 43, 45 of the drive drums. As the drums are rotated, any vegetation that is directed between the interface between the motors and the drive drums will be brought into engagement with the cutter bars and prevented from entering into the area therebetween. In some instances the cutter bar will simply deflect vegetation and in other instances the vegetation may be broken or severed thereby preventing any clogging of the drive mechanism. It should further be noted that, because the cutter bars are formed of a steel angle, the angle itself acts as a reinforcement for the engaging edges of the cutter bar.

With specific reference to FIG. 7, another embodiment of the present is shown in greater detail. In this embodiment, two pairs of drive drums are mounted on opposite sides of the vehicle frame. The drive drums are indicated at 60 and 61, 62 and 63. In this embodiment, the frame and the front and rear outriggers are essentially the same as disclosed with respect to the previous embodiment. In this embodiment, however, a pair of intermediate outriggers 64 and 65 are provided which are attached intermediate the length of the main frame. These outriggers are declined at generally the same angle as the rear outriggers and provide bearing supports for sets of hydraulic motors 65 and 66 and 67 and 68 which are drivingly connected by intermediate bearings or drive shafts 70 to the adjacent drive drums.

As with the previous embodiment, the drive drums are also rotated by second sets of hydraulic motors designated at 72, 73, 74 and 75. Each set of motors such as 72 and 66, 67 and 73, 74 and 68, and 69 and 75 are simultaneously driven with respect to one another from a fluid control valve 76 which is connected to the pairs of drive motors by hydraulic lines 78. In this manner, each drive drum is preferably driven by two hydraulic motors which are currently controlled through the hydraulic control valve 76 with each drum being separately controllable to be driven in either a forward or reverse direction. In this manner, the operator is capable of driving each of the drive drums independently of one another.

Each of the drive drums 60–63 are provided with a spiral flute 80, 81, 82, and 83, respectively. Each flute has a pitch angle within the range set forth with respect to the preferred embodiment and does not extend outwardly from the drum greater than approximately three inches for the same reasons as discussed with respect to the spiral flutes of the previous embodiment. In this embodiment, however, the pitch direction of the spiral flutes of drive drum 61 and 62 is in the forward direction, as was the case with the embodiment including two drive drums, however, drive drums 60 and 63 have rearwardly directed flutes and thus have a pitch angle in the opposite direction with respect to the flutes of drums 61 and 62. Therefore, the drums located diagonally with respect to each other such as 61 and 62 have their flutes oriented in the same direction.

In view of the foregoing, in this embodiment, it is noted that the vehicle is designed to generally operate with the drums on either side of the main frame being operated in opposite directions. This creates several benefits. First, the reverse rotation of the two drive drums on either side of the vehicle increases maneuverability, and second, the flutes working in opposite directions will provided greater traction in soft, muddy soils. A further benefit is achieved by allowing the drive drums to be independently reversed relative to their normal drive rotation which allows mud to be worked from between the surface and between the spiral flutes associated with each drive drum. Another advantage of having the flutes of the drive drum on the same side of a vehicle being oriented at opposite pitch angles is so that the flutes will not track within the same cut within a muddy soil, thereby allowing greater traction to be developed during the use of the vehicle. By controlling the direction of rotation of each of the hydraulic motors or sets of hydraulic motors, the drive drums are utilized to steer the vehicle while the rates of rotation of the drums will regulate the speed of the vehicle across a given surface.

As with the previous embodiment it is possible, in some instances, to use only a single hydraulic drive motor with each drive drum.

Also, in the present embodiment, cutting bars 52 are mounted to the outriggers and extend toward the conical ends of each of the drive drums for purposes of preventing any clogging of the interface between the drive motors and the drive drums as was previously discussed with respect to the previous embodiment. In addition, additional cutter bars 52' are mounted to the outriggers 64 and 65 and extend towards the conical ends of the adjacent drive drums at the midpoint of the vehicle frame.

We claim:

1. A lightweight amphibious land reclamation vehicle which is maneuverable in water, mud, slime and other surface areas comprising, a main frame having a top, a bottom, opposite sides and front and rear portions, a platform frame extending forwardly of said front portion of said main frame, a fuel tank, means for mounting said fuel tank on said platform frame, a first pair of outrigger members extending from said front portion of said main frame and a second pair of outrigger members extending outwardly and downwardly with respect to said rear portion of said main frame, at least one pair of drive drums mounted on opposite sides of said main frame and extending between said front outrigger members and said rear outrigger members, a drive motor means mounted to at least one of said front and rear outrigger members and being drivingly connected to each one of said drive drums, each drive drum having opposite end portions, cutter bar means extending from at least one of said front and rear outrigger members towards and in closely spaced relationship with respect to an end portion of each of said drive drums, each of said drive drums being hollow and having generally cylindrical outer surfaces, said drive drums providing sufficient buoyancy to permit the vehicle to float on water, each of said drums having a spiral flute extending outwardly therefrom and along the length of said cylindrical outer surface, at least a portion of each of said drive drums extending below said bottom of said main frame, and control means for controlling each of said drive motor means.

2. The lightweight amphibious land reclamation vehicle of claim 1 in which each of said spiral flutes of said drums is pitched at an angle of not greater than approximately 20° with respect to a vertical plane taken perpendicularly to an elongated axis through each drum.

3. The amphibious land reclamation vehicle of claim 2 in which each of said spiral flutes extends outwardly not greater than approximately 3" from the surface of said drive drums.

4. The amphibious land reclamation vehicle of claim 2 in which at least one-half of the diameter of each of said drums extends below said bottom of said main frame.

5. The amphibious land- reclamation vehicle of claim 4 wherein said platform including an inclined ramp for engaging material, said ramp extending upwardly and outwardly from adjacent said bottom portion of said main frame.

6. The amphibious land reclamation vehicle of claim 1 including a drive motor means mounted to each of said first and second pairs of outrigger members whereby each drive drum is driven by a pair of drive motor means.

7. The amphibious land reclamation vehicle of claim 6 including a cutter bar means extending from each of said front and rear outrigger members toward adjacent end portions of each of said drums.

8. A lightweight amphibious land reclamation vehicle which is maneuverable in water, mud, slime and other surface areas comprising, a main frame having a top, a bottom, opposite sides and front and rear portions, a platform frame extending forwardly of said front portion of said main frame, a fuel tank, means for mounting said fuel tank on said platform frame, first drive drums mounted on opposite sides of said frame and second drive drums mounted on opposite sides of said frame, a drive motor means drivingly connected to each of said first and second drive drums, means on each side of said frame for axially mounting one of each of said first and second drive drums rotatably about a common axis, each of said first and second drive drums being hollow and having a generally cylindrical outer surface, said first and second drive drums providing sufficient buoyancy to permit the vehicle to float on water, each of said first and second drive drums having a continuous spiral flute extending outwardly therefrom and along the length thereof, said spiral flutes of said first drive drums being pitched in an opposite direction to said spiral flutes of said second drive drums, at least a portion of each of said first and second drive drums extending below said bottom of said main frame, each of said first and second drive drums having end portions, cutter bar means mounted adjacent each of said motor means and extending to adjacent said end portion of said drums, and control means for controlling each of said drive motor means.

9. The amphibious land reclamation vehicle of claim 8 in which said spiral flutes of each of said first and second drive drums is pitched at an angle of approximately 20° or less with respect to a vertical plane taken perpendicularly to an elongated axis therethrough.

10. The amphibious land reclamation vehicle of claim 9 in which the pitch of each of said spiral flutes is between 18° and 19°.

11. The amphibious land reclamation vehicle of claim 9 including a first pair of oppositely oriented outrigger means extending adjacent said front portion of said main frame on opposite sides thereof, a second pair of oppositely oriented outrigger means extending from adjacent said rear portion of said main frame and on opposite sides thereof, a support bearing means mounted on each of said sides of said main frame intermediate said first and second outrigger means, one end of each of said first and second drive drums being supported by one of said first and second pairs of outrigger means and the other end of each of said first and second drive drums being supported by said support bearing means.

12. The amphibious land reclamation vehicle of claim 11 in which said first drive drums are mounted diagonally with respect to one another on opposite sides of said main frame and said second drive drums are mounted diagonally with respect to one another on opposite sides of said main frame.

13. The amphibious land reclamation vehicle of a claim 12 in which said first and second drive drums are of size such that not more than approximately one-half of their diameter are immersed when the vehicle floats on water.

14. The lightweight amphibious land reclamation vehicle of claim 13 in which each of said first and second drive drums is drivingly engaged to a motor at each end thereof.

15. The amphibious land reclamation vehicle of claim 14 in which each of said drive motor means is a reversibly operable hydraulic motor.

* * * * *